United States Patent
Chen

(10) Patent No.: US 7,765,876 B1
(45) Date of Patent: Aug. 3, 2010

(54) APPARATUS FOR CONNECTING A PRESSURE GAUGE TO A PIPE

(75) Inventor: Chun-Chun Chen, Taichung (TW)

(73) Assignee: ZenHeart Research Inc., Taichung (TW)

( * ) Notice: Subject to any disclaimer, the term of this patent is extended or adjusted under 35 U.S.C. 154(b) by 0 days.

(21) Appl. No.: 12/403,951

(22) Filed: Mar. 13, 2009

(51) Int. Cl.
*G01L 7/00* (2006.01)
(52) U.S. Cl. ....................................................... 73/756
(58) Field of Classification Search ................ 73/756, 73/37, 38, 714, 198, 40.5 R; 137/14; 123/90.55
See application file for complete search history.

(56) References Cited

U.S. PATENT DOCUMENTS

| | | | | |
|---|---|---|---|---|
| 4,599,890 A | * | 7/1986 | Girone et al. .................. 73/37 |
| 5,448,907 A | * | 9/1995 | Jensen et al. .................. 73/38 |
| 5,786,538 A | * | 7/1998 | Barone ........................ 73/714 |
| 5,804,716 A | * | 9/1998 | McGuire et al. .............. 73/198 |
| 5,992,438 A | * | 11/1999 | Shaw .......................... 137/14 |
| 6,862,918 B2 | * | 3/2005 | Saxton .................... 73/40.5 R |
| 6,918,364 B2 | * | 7/2005 | Vattaneo et al. .......... 123/90.55 |
| 2008/0098514 A1 | * | 5/2008 | Kelley ........................... 4/661 |

\* cited by examiner

*Primary Examiner*—Jewel Thompson
(74) *Attorney, Agent, or Firm*—Banger Shia

(57) ABSTRACT

Disclosed is an apparatus for connecting a pressure gauge to a pipe. The apparatus includes a cylinder, a joint/valve unit and a clip. The cylinder includes a space defined therein for receiving the pressure gauge, an aperture in communication with the space and a slit in communication with the aperture. The joint/valve unit includes a section for connection to the pipe and another section inserted in the aperture and formed with two grooves. The clip is inserted in the grooves through the slit, thus keeping the joint/valve connected to the cylinder.

9 Claims, 5 Drawing Sheets

APPARATUS FOR CONNECTING A PRESSURE GAUGE TO A PIPE

BACKGROUND OF INVENTION

1. Field of Invention

The present invention relates to a pressure gauge and, more particularly, to an apparatus for connecting a pressure gauge to a pipe.

2. Related Prior Art

Referring to FIG. 5, conventionally, a joint 1 is secured to a pressure gauge 2 so that the pressure gauge 2 can detachably be connected to a pipe through the joint 1. A valve is disposed in the joint 1. Fluid is transferred into the pressure gauge 2 from the pipe through the joint 1 so that the pressure of the fluid can be measured with the pressure gauge 2. The pressure gauge 2 includes components subjected to the pressure so that it is only natural that it will be broken after some time of use. When this happens, the pressure gauge 2 must be detached from the pipe and replaced with a new one. The joint 1 must also be detached from the pipe. However, the valve must also be detached from the pipe so that the pipe must be blocked one way or another to avoid leakage of the fluid. This is a troublesome and dangerous process.

The present invention is therefore intended to obviate or at least alleviate the problems encountered in prior art.

SUMMARY OF INVENTION

The primary objective of the present invention is to provide a quick and secure apparatus for connecting a pressure gauge to a pipe.

According to the present invention, the apparatus includes a cylinder, a joint/valve unit and a clip. The cylinder includes a space defined therein for receiving the pressure gauge, an aperture in communication with the space and a slit in communication with the aperture. The joint/valve unit includes a section for connection to the pipe and another section inserted in the aperture and formed with two grooves. The clip is inserted in the grooves through the slit, thus keeping the joint/valve connected to the cylinder.

Other objectives, advantages and features of the present invention will become apparent from the following description referring to the attached drawings.

BRIEF DESCRIPTION OF DRAWINGS

The present invention will be described via detailed illustration of the preferred embodiment versus prior art referring to the drawings.

DETAILED DESCRIPTION OF PREFERRED EMBODIMENT

Figure 1:
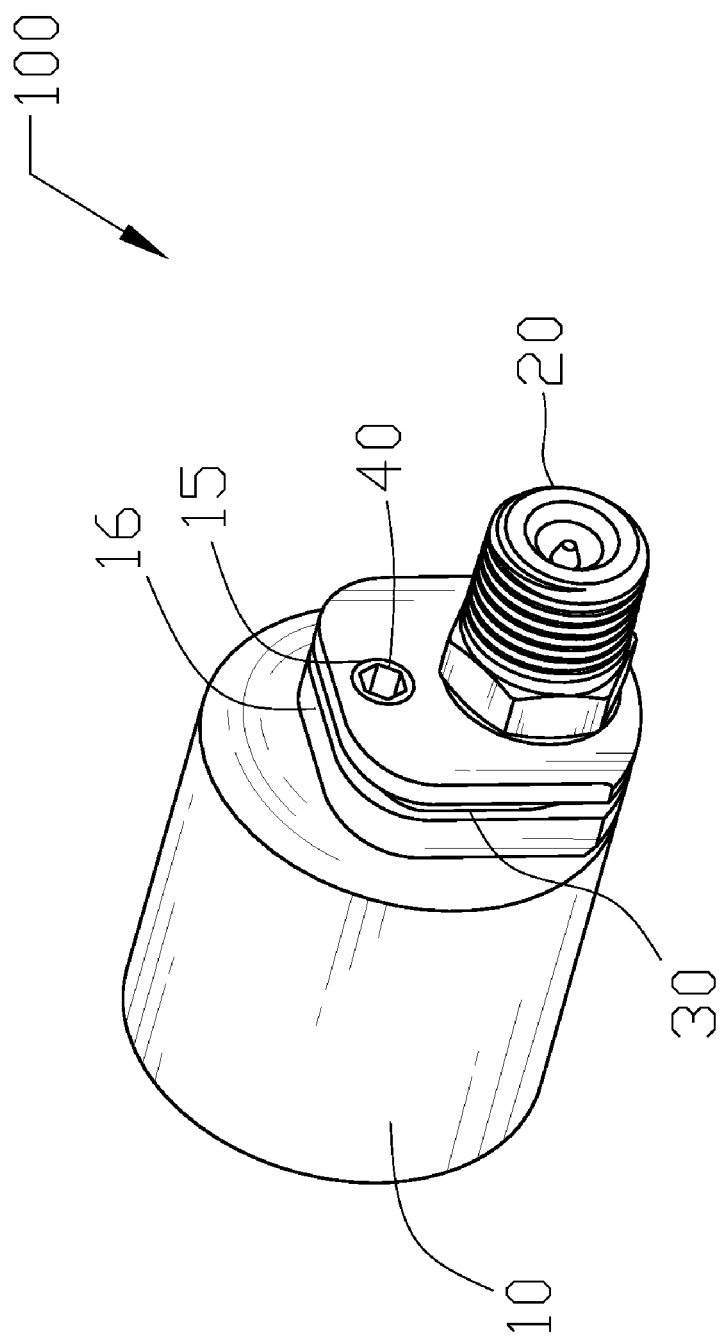
FIG. 1 is a perspective view of an apparatus for connecting a pressure gauge to a pipe according to the preferred embodiment of the present invention.
Figure 2:
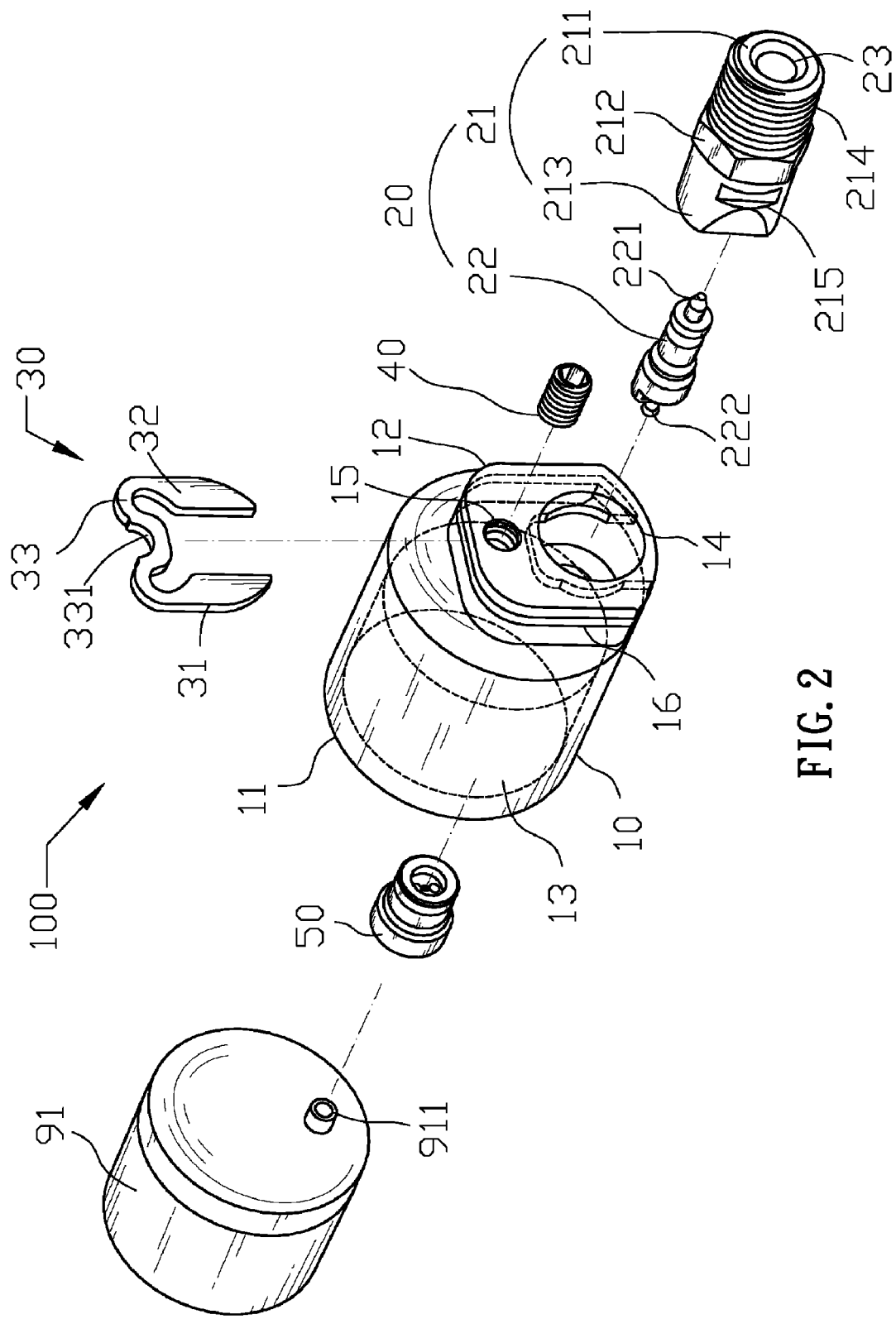
FIG. 2 is an exploded view of the apparatus and the pressure gauge shown in FIG. 1.

Referring to FIGS. 1 through 4, there is shown an apparatus 100 for connecting a pressure gauge 91 to a pipe. The apparatus 100 includes a cylinder 10, a joint/valve unit 20, a clip 30, a fastener 40 and a connector 50 according to the preferred embodiment of the present invention.

The cylinder 10 includes a receiving section 11 and a connecting section 12. A space 13 is defined in the receiving section 11. The connecting section 12 includes an aperture 14, a screw hole 15 and a slit 16. The aperture 14 is in communication with the space 13. The slit 16 is defined in the periphery of the connecting section 12 and in communication with the aperture 14. The screw hole 15 is in communication with the slit 16.

The joint/valve unit 20 includes a joint 21 and a valve 22 disposed in the joint 21 that is hollow. The joint 21 includes a threaded section 211, a recessed section 213 and a shoulder 212 formed between the threaded section 211 and the recessed section 213. The threaded section 211 is formed with a thread 214 for engagement with a thread formed on an internal side of the pipe. The shoulder 212 includes a hexagonal periphery so that it can be operated with a wrench. The transverse dimension of the shoulder 212 is larger than those of the threaded section 211 and the recessed section 213. Two grooves 215 are defined in the periphery of the recessed section 213. The joint 21 includes a tunnel 23 throughout the threaded section 211, the shoulder 212 and the recessed section 213.

The valve 22 includes an inlet section 221 and an outlet section 222 opposite to the inlet section 221. The inlet section 221 allows fluid to enter the valve 22. When pushed, the outlet section 222 releases the fluid from the valve 22.

The clip 30 includes a middle section 33 formed between two terminal sections 31 and 32. A recess 331 is defined in the middle section 33 of the clip 30.

Figure 3:
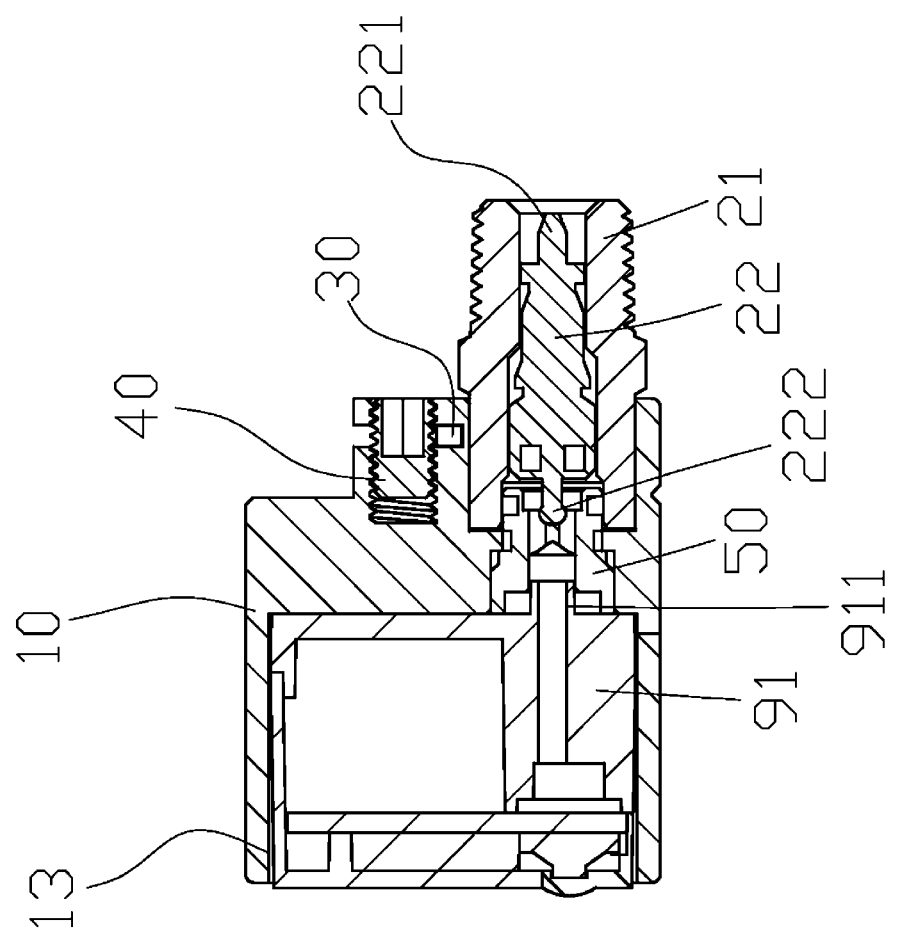
FIG. 3 is a cross-sectional view of the apparatus and the pressure gauge shown in FIG. 1.

Referring to FIG. 3, the valve 22 is securely disposed in the joint 21. The recessed section 213 of the joint 21 is disposed in the aperture 14. The connector 50 is also disposed in the aperture 14. The pressure gauge 91 is disposed in the space 13. The inlet section 221 of the valve 22 is pointed to the pipe while the outlet section 222 of the valve 22 is directed to the pressure gauge 91. The pressure gauge 91 can be kept in the space 13 with adhesive. The connector 50 includes an end in contact with the outlet section 222 of the valve 22 and an opposite end for receiving a tube 911 extended from the pressure gauge 91. Thus, the fluid can flow into the pressure gauge 91 from the pipe through the apparatus 100.

Figure 4:
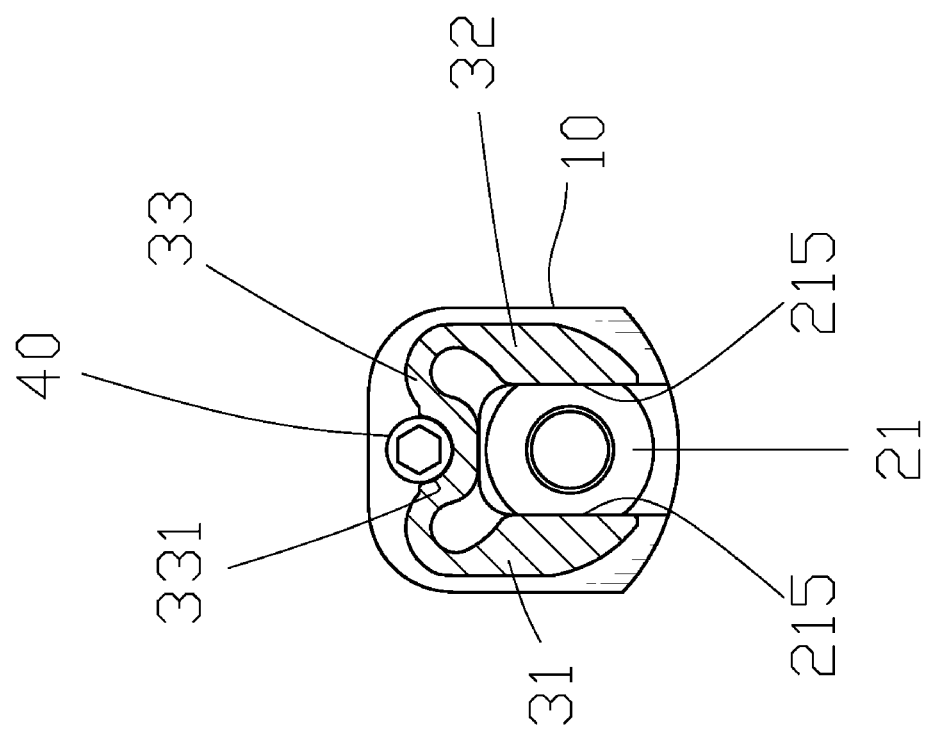
FIG. 4 is another cross-sectional view of the apparatus and the pressure gauge shown in FIG. 1.
Figure 5:
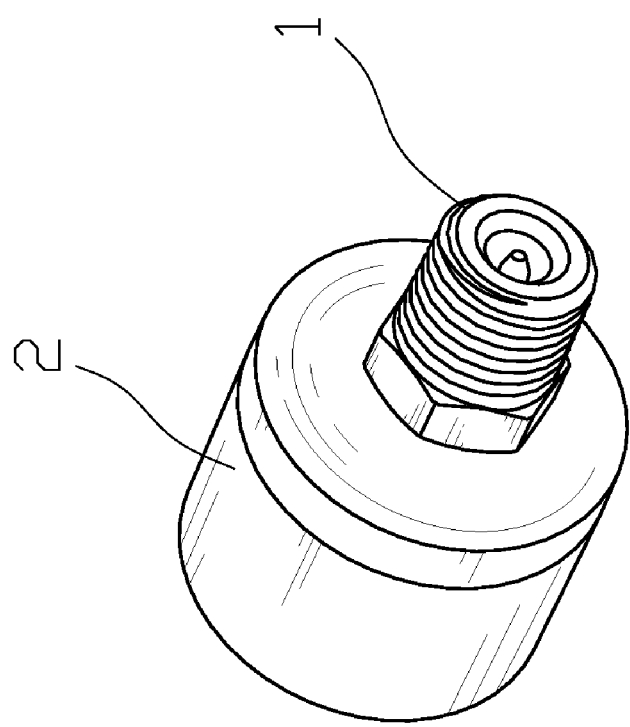
FIG. 5 is a perspective view of a conventional apparatus for connecting a pressure gauge to a pipe.

Referring to FIG. 4, the terminal sections 31 and 32 of the clip 30 are inserted in the grooves 215 through the slit 16 so that the joint/valve unit 20 is kept connected to the cylinder 10. The fastener 40 is in the form of a screw driven in the screw hole 15. The fastener 40 is disposed in the recess 331 of the clip 30, i.e., against the middle section 33 of the clip 30 to ensure the clip 30 the connection of the joint/valve unit 20 to the cylinder 10.

The apparatus 100 enables a quick and secure process for connecting the pressure gauge 91 to the pipe and disconnecting them from each other. To secure the connection of the cylinder 10 to the joint/valve unit 20, the clip 30 is inserted and the fastener 40 tightened. To disconnect the cylinder 10 from the joint/valve unit 20, the fastener 40 is slacked and the clip 30 removed. In the meantime, the joint/valve unit 20 is connected to the pipe and the outlet section 222 of the valve 22 released to avoid leakage of the fluid from the pipe.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for connecting a pressure gauge to a pipe, the apparatus comprising:
   a cylinder comprising a space defined therein for receiving the pressure gauge, an aperture in communication with the space and a slit in communication with the aperture;
   a joint/valve unit comprising a section for connection to the pipe and another section inserted in the aperture and formed with two grooves; and
   a clip inserted in the grooves through the slit, thus keeping the joint/valve connected to the cylinder.

2. The apparatus according to claim 1, wherein the cylinder comprises a receiving section and a connecting section opposite to the receiving section, the space is defined in the receiving section, and the aperture and the slit are defined in the connecting section.

3. The apparatus according to claim 1, wherein the joint/valve unit comprises:
   a joint comprising a tunnel defined therein, wherein the grooves are defined in the periphery of the joint; and
   a valve disposed in the tunnel and formed with an inlet section for allowing fluid into the valve and an outlet operable to release the fluid from the valve.

4. The apparatus according to claim 3, wherein the joint comprises:
   a threaded section formed with a thread for engagement with a thread formed on an internal side of the pipe;
   a recessed section inserted in the aperture, wherein the grooves are defined in the periphery of the recessed section; and
   a shoulder formed between the threaded section and the recessed section, wherein the shoulder is made with a transverse dimension larger than those of the threaded section and the recessed section.

5. The apparatus according to claim 3, wherein the valve comprises an inlet section pointed to the pipe and an outlet section directed to the pressure gauge.

6. The apparatus according to claim 1, wherein the clip comprises two terminal sections inserted in the grooves through the slit and a middle section formed between the terminal sections.

7. The apparatus according to claim 1 comprising a fastener, wherein the cylinder comprises a screw hole in communication with the slit, and the fastener is driven in the slit through the screw hole to restrain the clip.

8. The apparatus according to claim 7, wherein the clip comprises a recess defined in an edge thereof, and the fastener is inserted in the recess.

9. The apparatus according to claim 3 comprising a connector disposed in the aperture and formed with an end in contact with the second end of the valve and an opposite end for receiving a tube extended from the pipe.

* * * * *